US012773845B2

(12) United States Patent
Strange, Jr. et al.

(10) Patent No.: US 12,773,845 B2
(45) Date of Patent: Oct. 27, 2026

(54) INFRARED HEAT ASSISTED DRYING OF THIN FILMS

(71) Applicant: PPG Advanced Surface Technologies, LLC, Columbus, OH (US)

(72) Inventors: Andrew C. Strange, Jr., Columbus, OH (US); James E. Mcguire, Jr., Columbus, OH (US); Shane Michael Scott, Columbus, OH (US)

(73) Assignee: PPG Advanced Surface Technologies, LLC, New Albany, OH (US)

( * ) Notice: Subject to any disclaimer, the term of this patent is extended or adjusted under 35 U.S.C. 154(b) by 109 days.

(21) Appl. No.: 18/546,105

(22) PCT Filed: Feb. 10, 2022

(86) PCT No.: PCT/US2022/015946

§ 371 (c)(1),
(2) Date: Aug. 11, 2023

(87) PCT Pub. No.: WO2022/173927

PCT Pub. Date: Aug. 18, 2022

(65) Prior Publication Data

US 2024/0131831 A1 Apr. 25, 2024
US 2024/0227376 A9 Jul. 11, 2024

Related U.S. Application Data

(60) Provisional application No. 63/149,193, filed on Feb. 12, 2021.

(51) Int. Cl.
*B32B 37/06* (2006.01)
*B32B 7/12* (2006.01)
(Continued)

(52) U.S. Cl.
CPC ................ *B32B 37/06* (2013.01); *B32B 7/12* (2013.01); *B32B 27/08* (2013.01); *B32B 27/308* (2013.01);
(Continued)

(58) Field of Classification Search
CPC ... B32B 37/06; B32B 37/003; B32B 37/0038; B32B 2310/0825; B32B 2605/08;
(Continued)

(56) References Cited

U.S. PATENT DOCUMENTS 1,504,736 A 8/1924 Brown
3,699,623 A 10/1972 Kreider
(Continued)

FOREIGN PATENT DOCUMENTS

CN 103538339 A 1/2014
CN 107187642 A 9/2017
(Continued)

OTHER PUBLICATIONS

Tock, "Permeabilities and Water Vapor Transmission Rates for Commercial Polymer Films", 1983.*
(Continued)

*Primary Examiner* — John L Goff, II

(57) ABSTRACT

A method of applying a paint film to a substrate may include wetting a surface of the substrate or an adhesive layer of a paint film to form a fluid layer thereon. The paint film may further comprise a polymer film layer. The method may further include applying the paint film to the substrate such that the fluid layer is positioned between the adhesive layer and the surface. The applied paint film may be heated with infrared heat to facilitate the removal of the fluid layer and adhere the adhesive layer to the surface. Systems and devices for applying a paint film to a substrate are also disclosed.

10 Claims, 11 Drawing Sheets

(51) Int. Cl.

| | |
|---|---|
| ***B32B 27/08*** | (2006.01) |
| ***B32B 27/30*** | (2006.01) |
| ***B32B 27/40*** | (2006.01) |
| ***B32B 37/12*** | (2006.01) |
| ***C09J 5/02*** | (2006.01) |
| ***C09J 5/06*** | (2006.01) |
| ***C09J 7/25*** | (2018.01) |
| ***C09J 7/38*** | (2018.01) |

(52) U.S. Cl.

CPC .......... *B32B 27/40* (2013.01); *B32B 37/1207* (2013.01); *C09J 5/02* (2013.01); *C09J 5/06* (2013.01); *C09J 7/25* (2018.01); *C09J 7/385* (2018.01); *B32B 2307/7246* (2013.01); *B32B 2309/02* (2013.01); *B32B 2309/04* (2013.01); *B32B 2310/0825* (2013.01); *B32B 2333/08* (2013.01); *B32B 2375/00* (2013.01); *B32B 2605/08* (2013.01); *C09J 2203/354* (2020.08); *C09J 2301/302* (2020.08); *C09J 2301/416* (2020.08); *C09J 2433/00* (2013.01); *C09J 2475/006* (2013.01)

(58) Field of Classification Search

CPC .............. B32B 2605/00; B32B 38/164; B32B 2037/109; B32B 2038/166; B32B 2038/168; B32B 37/1207; B32B 7/12; B32B 27/08; B32B 27/308; B32B 27/40; B32B 2307/7246; B32B 2307/724; B32B 2309/02; B32B 2309/04; B32B 2333/08; B32B 2375/00; B32B 2255/10; B32B 2038/0084; B32B 2038/0088; C09J 5/02; C09J 5/06; C09J 2203/354; C09J 2475/008; C09J 7/25; C09J 7/385; C09J 2301/302; C09J 2301/416; C09J 2301/122; C09J 2433/00; C09J 2475/006; C09J 5/08; B29C 2063/483; B29C 63/02

USPC ........................................ 156/79, 275.7, 289

See application file for complete search history.

(56) References Cited

U.S. PATENT DOCUMENTS

| | | | | |
|---|---|---|---|---|
| 4,318,672 | A | | 3/1982 | Hansen |
| 4,565,495 | A | | 1/1986 | MacLeod, Jr. |
| 4,580,944 | A | | 4/1986 | Miller |
| 4,842,663 | A | | 6/1989 | Kramer |
| 4,935,277 | A | | 6/1990 | Le Balc'h |
| 4,948,859 | A | | 8/1990 | Echols et al. |
| 5,098,037 | A | | 3/1992 | Leffel et al. |
| 5,114,789 | A | | 5/1992 | Reafler |
| 5,123,814 | A | | 6/1992 | Burdick et al. |
| 5,344,235 | A | | 9/1994 | Weetman et al. |
| 5,486,096 | A | | 1/1996 | Hertel et al. |
| 5,518,786 | A | | 5/1996 | Johnson et al. |
| 5,544,845 | A | | 8/1996 | Giamati et al. |
| 5,656,364 | A | | 8/1997 | Rickerby et al. |
| 5,743,494 | A | | 4/1998 | Giamati et al. |
| 5,965,256 | A | | 10/1999 | Barrera |
| 6,265,057 | B1 | | 7/2001 | Giamati |
| 6,352,601 | B1 | | 3/2002 | Ray |
| 6,489,024 | B2 | | 12/2002 | Griffith, Jr. et al. |
| 6,960,065 | B2 | | 11/2005 | Leach |
| 7,237,751 | B2 | | 7/2007 | Anning |
| 7,334,759 | B2 | | 2/2008 | Castillo et al. |
| 7,374,404 | B2 | | 5/2008 | Schilling |
| 7,408,604 | B2 | | 8/2008 | Takada et al. |
| 7,736,745 | B2 | | 6/2010 | Hong |
| 7,968,977 | B2 | | 6/2011 | Seo et al. |
| 8,096,508 | B2 | | 1/2012 | Marx et al. |
| 8,101,527 | B2 | | 1/2012 | Seo et al. |
| 8,178,205 | B2 | | 5/2012 | Hong |
| 9,573,164 | B2 | | 2/2017 | Amick et al. |
| 9,656,442 | B2 | | 5/2017 | Johnson et al. |
| 2001/0035256 | A1 | * | 11/2001 | Hall ........................ B29C 51/00 156/212 |
| 2007/0231569 | A1 | | 10/2007 | Tanaka et al. |
| 2008/0159870 | A1 | | 7/2008 | Hong |
| 2008/0314500 | A1 | | 12/2008 | Boers et al. |
| 2009/0039200 | A1 | | 2/2009 | Marx et al. |
| 2010/0098942 | A1 | * | 4/2010 | Stachnik .................. B60J 11/00 428/351 |
| 2011/0094664 | A1 | | 4/2011 | Song et al. |
| 2012/0034094 | A1 | | 2/2012 | Wansink |
| 2012/0091277 | A1 | | 4/2012 | Marx et al. |
| 2016/0137883 | A1 | | 5/2016 | Igarashi et al. |
| 2017/0073552 | A1 | * | 3/2017 | Schmid .................. C09J 133/08 |
| 2017/0226385 | A1 | | 8/2017 | Hiraki et al. |
| 2019/0161646 | A1 | | 5/2019 | McGuire, Jr. et al. |

FOREIGN PATENT DOCUMENTS

| | | | |
|---|---|---|---|
| CN | 208801616 | U | 4/2019 |
| CN | 111670606 | A | 9/2020 |
| EP | 0359532 | A2 | 3/1990 |
| EP | 0359532 | B1 | 10/1995 |
| EP | 1695820 | B1 | 6/2011 |
| EP | 2604664 | A1 | 6/2013 |
| GB | 2047188 | A | 11/1980 |
| JP | 09-192593 | A | 7/1997 |
| JP | 2010-121044 | A | 6/2010 |
| JP | 2015-017148 | A | 1/2015 |
| JP | 3195376 | U | 1/2015 |
| JP | 2018-131472 | A | 8/2018 |
| JP | 2018-184567 | A | 11/2018 |
| KR | 10-0787836 | B1 | 12/2007 |
| WO | 1996/00842 | A1 | 1/1996 |
| WO | 2004/099320 | A2 | 11/2004 |
| WO | 2008/051629 | A2 | 5/2008 |
| WO | 2008/157013 | A1 | 12/2008 |
| WO | 2009/023424 | A2 | 2/2009 |
| WO | 2009/100341 | A1 | 8/2009 |
| WO | 2010/117262 | A1 | 10/2010 |
| WO | 2012/031168 | A1 | 3/2012 |
| WO | 2016/010041 | A1 | 1/2016 |

OTHER PUBLICATIONS

International Search Report and Written Opinion received for PCT Application Serial No. PCT/US2022/015946 dated May 11, 2022, 8 pages.

Youtube video https://www.youtube.com/watch?v=UtRPgWrvh1c, downloaded to attached Word document showing screenshots of person performing a Full Hood Bulk Clear Bra PPF Installation. Uploaded Jan. 8, 2021 by Drive Protected, A Paint Protection Film (PPF) channel sharing tips and tricks to becoming a successful DIY PPF installer.

DIY PPF: The Ultimate Guide for Beginners, Drive Protected, Play List—DIY PPF—Do It Yourself the Basics to a Successful Full Hood Bulk Clear Bra PPF Installation!, online available at <https://www.youtube.com/watch?v=UtRPgWrvh1c>, Jan. 8, 2021, 1 page.

* cited by examiner

INFRARED HEAT ASSISTED DRYING OF THIN FILMS

CROSS REFERENCE TO RELATED APPLICATIONS

This application claims the benefit of U.S. Provisional Patent Application No. 63/149,193, filed 12 Feb. 2021, the entire disclosure of which is incorporated by reference herein

INCORPORATION BY REFERENCE

All publications and patent applications mentioned in this specification are herein incorporated by reference to the same extent as if each individual publication or patent application was specifically and individually indicated to be incorporated by reference.

FIELD

The present invention relates generally to paint films, methods of applying and using the same, and articles comprising the same.

BACKGROUND

In recent years, paint films have gained popularity as an alternative to traditional surface painting methods in many different types of applications, especially motorized vehicles such as automobiles, airplanes, and boats. This popularity is at least partially a result of the paint films being more durable and sustainable compared to traditional paint.

One exemplary paint film is the Aero Satin clean 200 film, which is a clear film used to change the surface of a vehicle. These films and methods of manufacturing are described in U.S. Publication No. 20190161646, the entirety of which is incorporated by reference herein.

Typically, a paint film is applied by a wet installation process. However, the wet installation process, especially when adapted by aftermarket installers, is often imperfect. For example, thick water bubbles can form underneath the applied paint film. Unless the water bubbles are dried out completely, the paint film cannot adhere to the surface (e.g., the surface of the vehicle) properly. As a result, adhesion of the film typically requires at least 24 hours to enable full adhesion. This drying time is burdensome, especially in an OEM manufacturing production line. Therefore, it would be beneficial to have a faster paint film drying method that can also minimize installation defects.

SUMMARY OF THE DISCLOSURE

Described herein are improved application methods of a paint film using infrared (IR) heat assisted drying.

In general, in one embodiment, a method of applying a paint film to a substrate includes wetting a surface of a substrate or an adhesive layer of a paint film having a polymer film layer to form a fluid layer thereon, applying the paint film to the substrate such that the fluid layer is positioned between the adhesive layer and the surface, and heating the applied paint film with infrared heat to facilitate the removal of the fluid layer and adhere the adhesive layer to the surface.

This and other embodiments can include one or more of the following features. The step of wetting can include wetting both the surface and the adhesive layer. The method can further include using a squeegee to remove a portion of the fluid layer prior to heating. The portion can include at least 80% of the fluid layer. The polymer film layer can include a moisture vapor transition rate (MVTR) of at least 1 $g/m^2/24$ hr. The polymer film layer can include polyurethane. The adhesive layer can include a pressure sensitive adhesive. The adhesive layer can include polyacrylate. Heating the applied paint film with the infrared heat can increase the moisture vapor transmission rate of the paint film by at least 2 times. The paint film can be adhered to the surface of the substrate in less than 60 minutes. The drying time of the paint film can be reduced by at least 75% compared to drying at room temperature. Heating can include heating the paint film to between 30° C. and 100° C. The substrate can include a motorized vehicle.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

DETAILED DESCRIPTION

Described herein are improved methods for applying a paint film to a substrate. In particular, described herein is a method of applying a paint film to a motorized vehicle using infrared heat so as to adhere the film to the vehicle efficiently, such as in less than one hour. The disclosed paint film application method with IR heat can advantageously reduce the drying time by at least 75% relative to drying the paint film at room temperature. Additionally, the method described herein can help reduce defects in the applied paint film. The method described herein can be especially useful to accelerate the cycle time of film application to motorized vehicles (e.g., for automobile production lines at an OEM facility).

Figure 1:
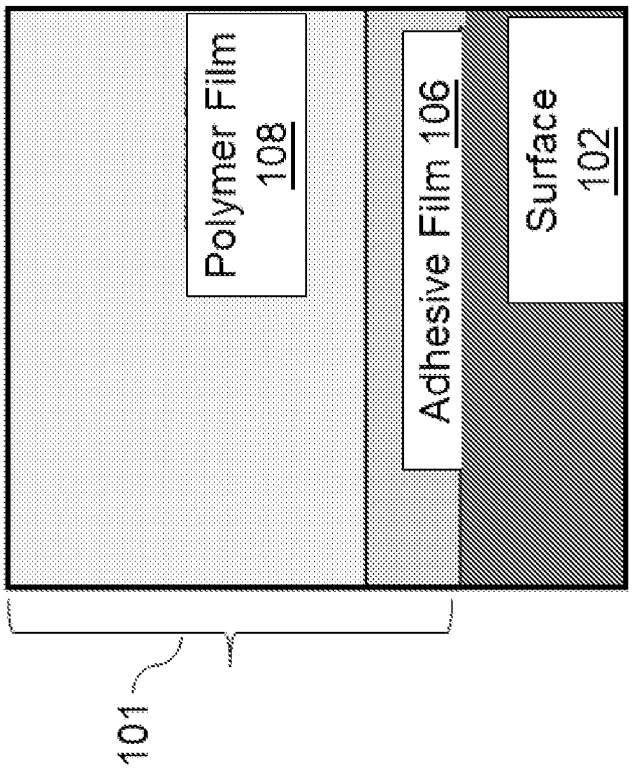
FIG. 1 illustrates a paint film on a surface of a substrate.

FIG. 1 illustrates an exemplary paint film 101 on a surface 102 (e.g., a surface of a motorized vehicle). The paint film 101 includes a polymer film layer 108 and an adhesive layer 106. The paint film 101 can be a polymer laminate having the ability to transmit moisture. For example, the paint film 101 can have a moisture vapor transition rate (MVTR) of at least 1 g/m$^2$/24 hr. In one embodiment, the polymer film layer 108 can be a polyurethane or a polyacrylate. For example, the polymer film layer 108 can be a polymer containing urethane (also known as carbamate) linkages, urea linkages, or combinations thereof (i.e., in the case of poly(urethane-urea)s). Thus, the polymer film layer 108 can contain at least urethane linkages, urea linkages, or combinations thereof. In some embodiments, the polymer film layer 108 can have a polymeric backbone with at least 40%, at least 60%, or at least 80% urethane and/or urea repeat linkages formed in-situ during the polymerization process. The adhesive layer 106 can include a pressure-sensitive adhesive. In some embodiments, the pressure sensitive adhesive can include (meth)acrylate (i.e., acrylate and methacrylate). For example, the pressure sensitive adhesive can include 2-ethyl hexyl acrylate, vinyl acetate, and acrylic acid monomers polymerized and cross-linked with conventional aluminum or melamine crosslinkers. In some embodiments, the adhesive layer 106 can include synthetic and natural rubbers, polybutadiene and copolymers thereof, polyisoprene and copolymers thereof, and/or silicones (e.g., polydimethylsiloxane and polymethylphenylsiloxane). In some embodiments, the paint film 101 can additionally include a pigmented basecoat. Additional features of an exemplary paint film are described in U.S. Publication No. 20190161646, titled "Paint Film Appliques with Reduced Defects, Articles and Methods," the entirety of which is incorporated by reference herein.

Figure 2:
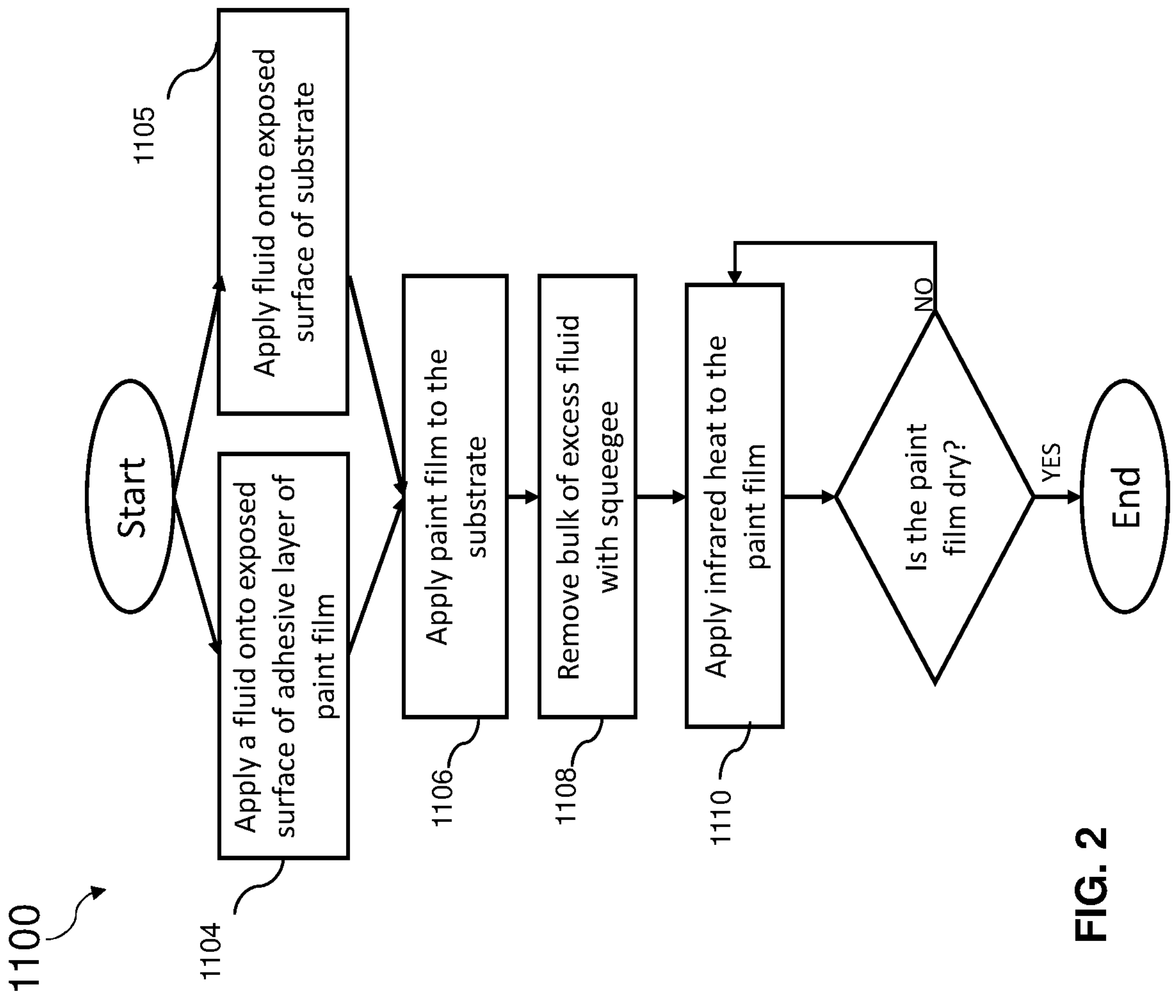
FIG. 2 illustrates an exemplary flow diagram for applying a paint film to a substrate using infrared heat assisted drying.

Referring to FIG. 2, a method (shown by flow diagram 1100) of applying the paint film 101 can include, at step 1104, applying (e.g., spraying) a fluid (e.g., water) to an exposed surface of the adhesive layer 106 of the paint film 101. Similarly, at step 1105, the fluid can be applied to the surface 102 of the substrate. At step 1106, the wetted adhesive layer 106 can then be applied to the wetted surface 102 of the substrate. At step 1108, the bulk of the fluid between the film 101 and the surface 102 of the substrate, such as greater than 80%, such as greater than 90%, such as greater than 95%, of the fluid can be physically removed (e.g., by using a squeegee to compress the film against the surface 102 of the substrate, thus forcing the fluid from the interface). In one embodiment, the amount of fluid between the film 101 and the surface 102 of the substrate can be reduced from greater than 200 g/m$^2$, greater than 300 g/m$^2$, or greater than 400 g/m$^2$ initially to less than 50 g/m$^2$, such as less than 25 g/m$^2$, such as less than 10 g/m$^2$, such as less than 5 g/m$^2$ after the physical removal of fluid (e.g., using the squeegee). At step 1110, infrared heat can be applied to the paint film 101 to further remove the fluid (e.g., leaving less than 2 g/m$^2$, such as less than 1 g/m$^2$, such as less than 0.1 g/m$^2$, such as less than 0.01 g/m$^2$ of fluid). The infrared heat can be applied between 30° C. and 100° C., such as between 40° C. and 90° C. The infrared heat can advantageously penetrate through the paint film 101 and be absorbed by polymers in the film 101 and water molecules. Advantageously, the infrared heat can be used to enable drying of the paint film 101 in less than 2 hours, such as less than 1 hour, such as less than 45 minutes, such as less than 30 minutes.

Figure 3:
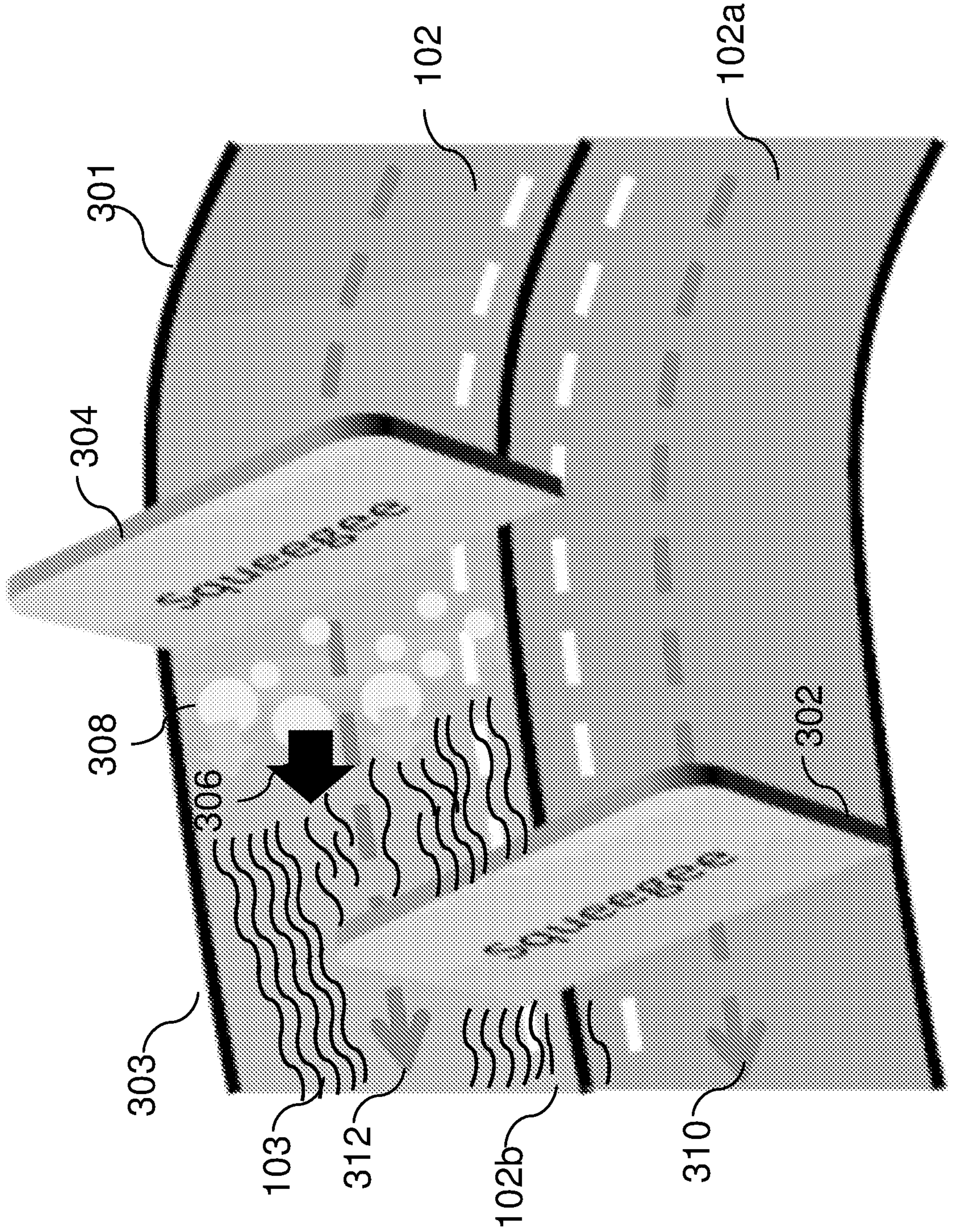
FIG. 3 illustrates the use of squeegees to remove fluid from between a paint film and a substrate.

FIG. 3 illustrates the initial step of removing the fluid between the paint film 101 and the surface 102 during the wet installation process (e.g., during step 1108 described above). Shown in FIG. 3 are the surface 102 having fluid 103 (shown by the wavy lines) and the paint film 101 (transparent and not visible). Also shown are squeegees 302 and 304, which are moved in the directions shown by the arrows 306, 310 and 312 to remove the fluid molecules 308. The portion 301 indicates the surface 102 after a squeegee has been performed and the portion 303 indicates the surface 102 on which squeegee is not yet performed. In some embodiments, the pressure and/or overlapping of squeegee strokes can be tailored so as to maximize the amount of fluid removed from between the paint film 101 and the surface 102.

Figure 4:
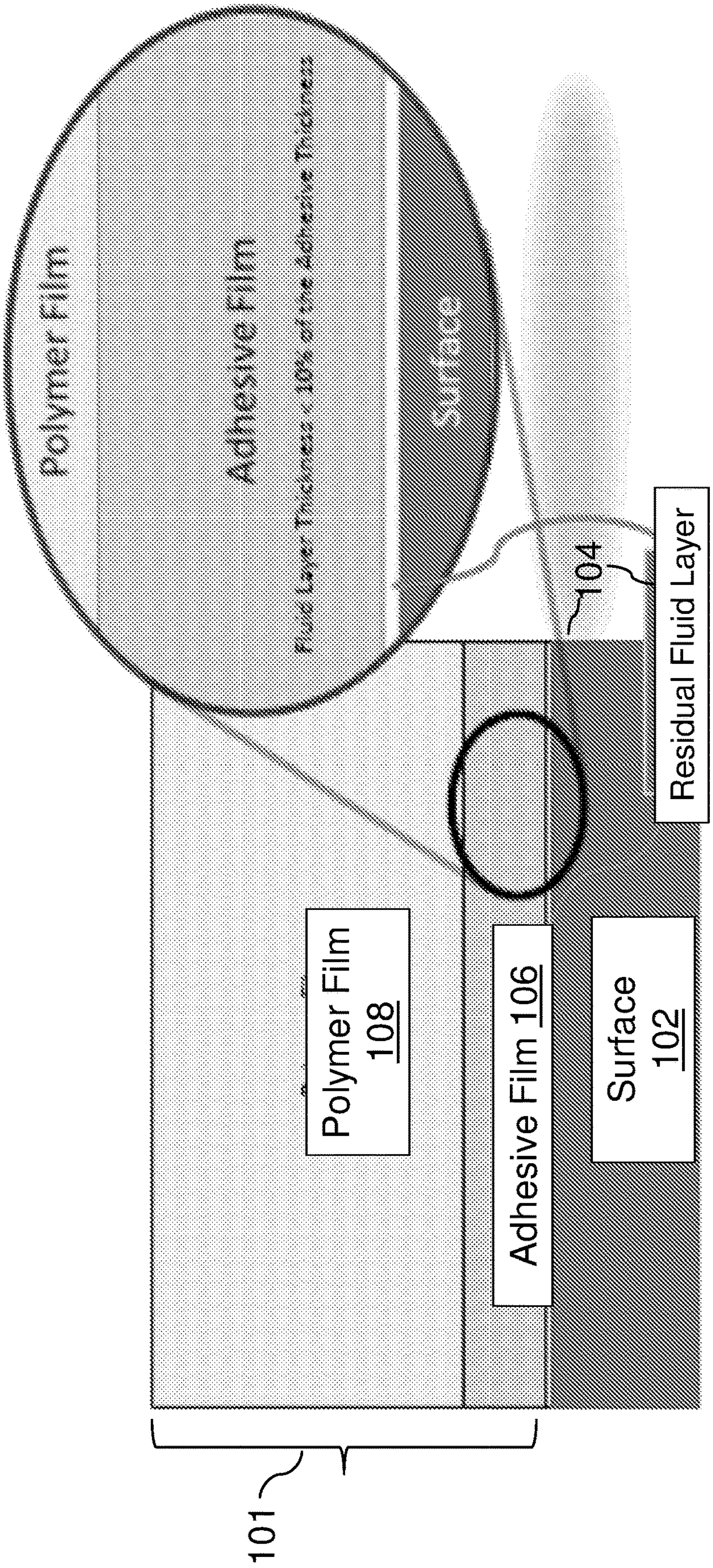
FIG. 4 illustrates the residual fluid layer that can remain during a wet installation process of a paint film to a substrate.

As shown in FIG. 4, even after optimizing the squeegee process, residual fluid 104 can remain behind and underneath the paint film 101. In some embodiments, the residual fluid 104 at this stage can be less than 10 microns thick and/or less than 10% of the thickness of the adhesive layer 106. While this small residual layer 104 may seem insignificant, fluid can prevent a full contact of the adhesive layer 106 with the substrate (particularly when the adhesive layer 106 is hydrophilic).

Figure 5:
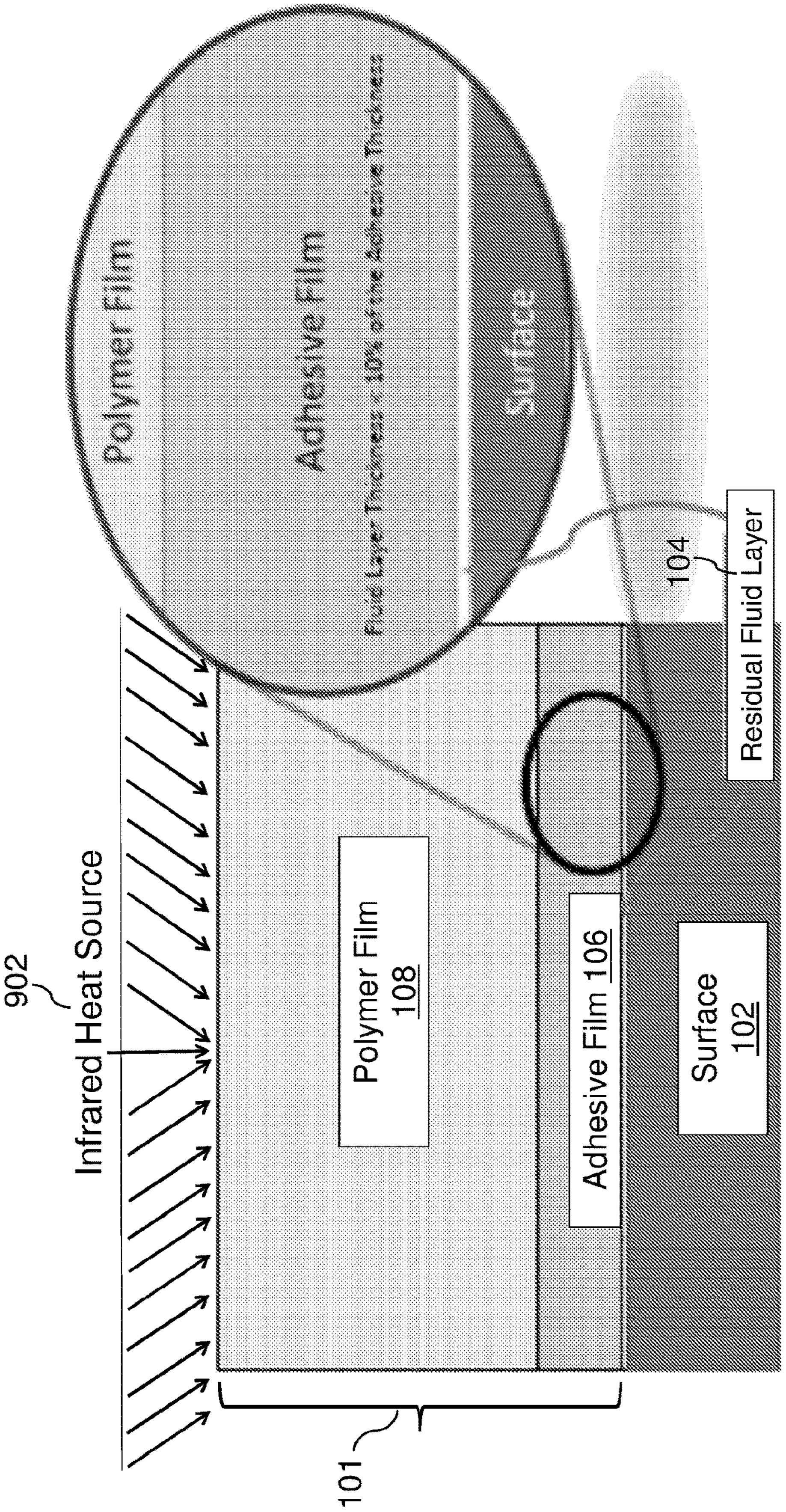
FIG. 5 illustrates the use of heat to dry a residual fluid layer.
Figure 11:
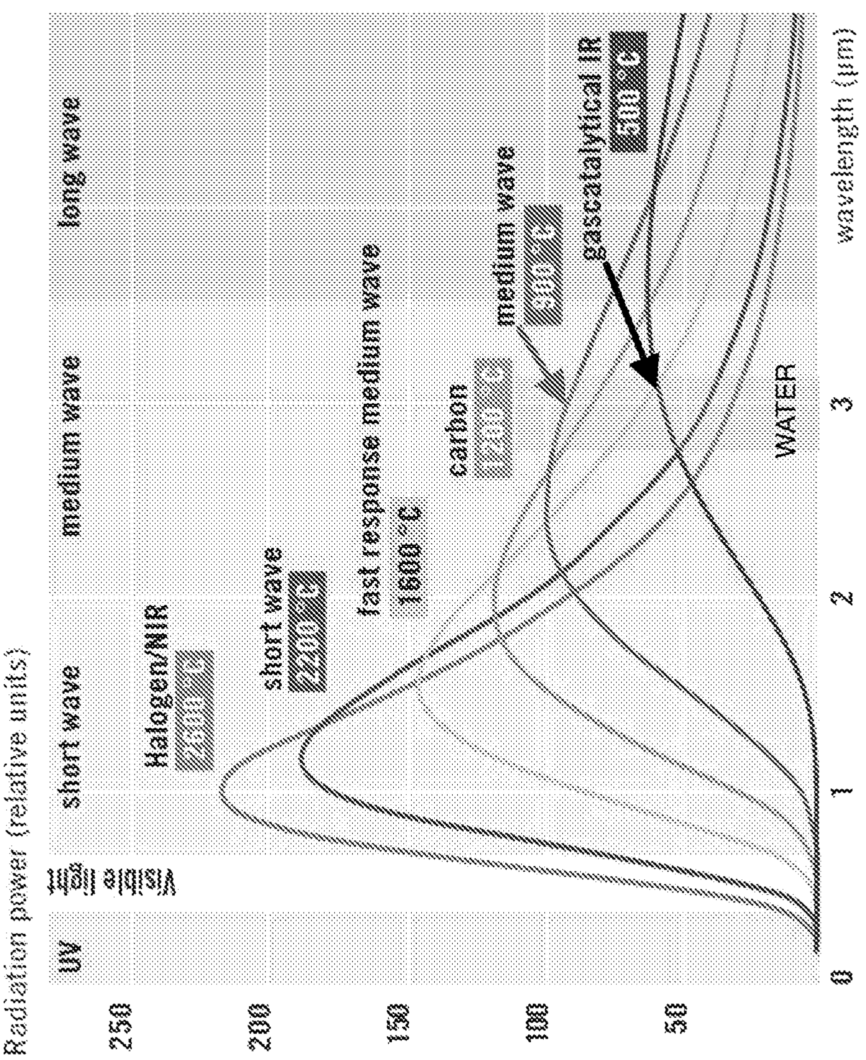
FIG. 11 is a graph of wavelength vs radiation power.

Thus, as shown in FIG. 5, infrared heat can be applied to the paint film 101 (e.g., as described during step 1110 described above) to remove the residual fluid layer 104. As shown, the IR heat source 902 can be directed towards the paint film 101 to remove the residual fluid layer 104. Referring to FIG. 11, in some embodiment, the infrared heat can be applied to the paint film 101 at "medium wave" IR wavelengths, which may better enable interaction with and/or preferential heating of polymer and water molecules in or around the paint film 101. Advantageously, the medium wave IR wavelengths may prevent a strong interaction with the surface 102 of the substrate, such as any underlying paint on the surface 102. The medium wave IR wavelengths may also have less variation when interacting with different colors or pigments in the paint film 101.

Figure 6:
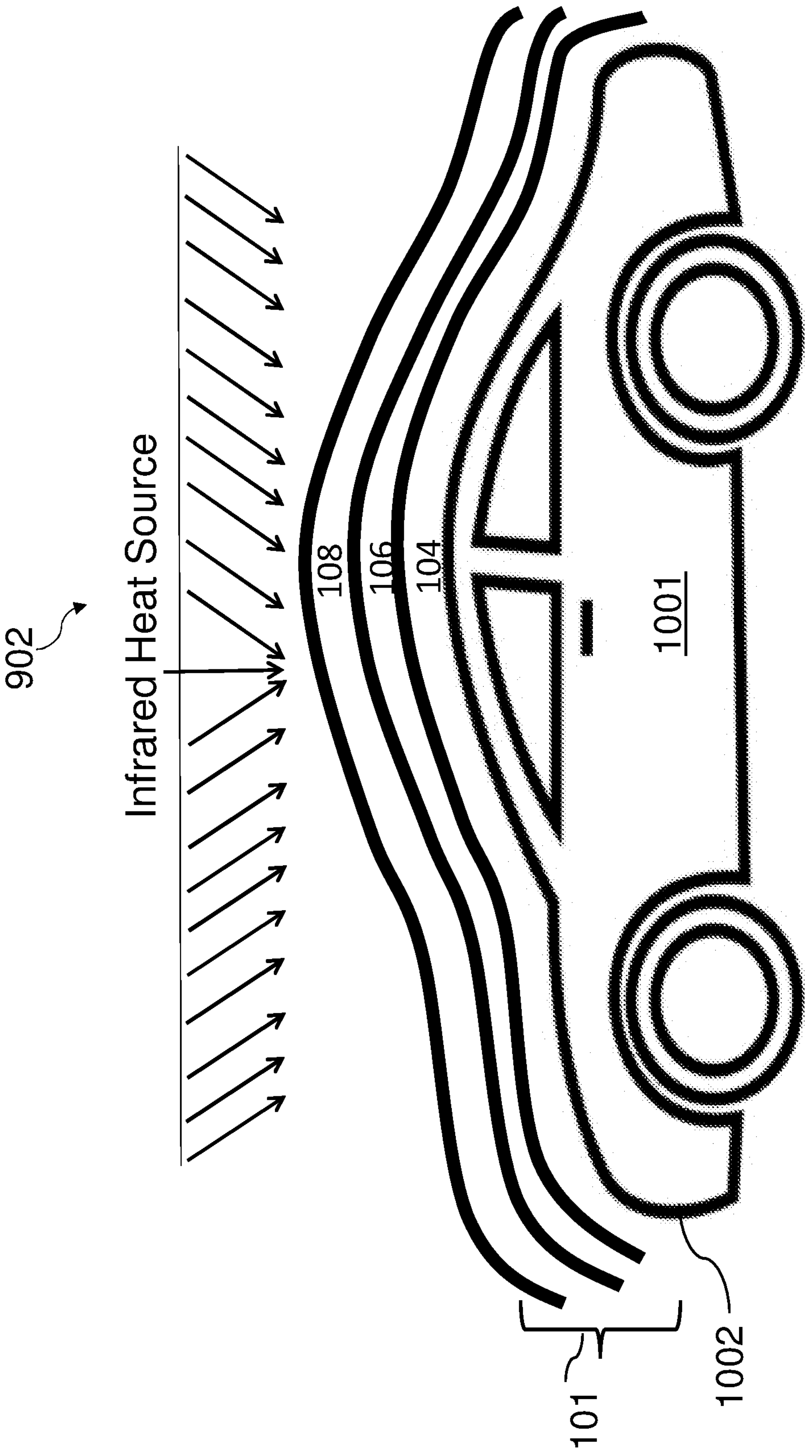
FIG. 6 illustrates an exemplary set-up for infrared heat assisted drying of the paint film on the surface of a car.

FIG. 6 illustrates and exemplary set-up for infrared heat assisted drying of the paint film on the surface 1002 of a car 1001. As shown the paint film 101 is placed on the surface 1002 of the car 1001. The residual fluid layer 104, the adhesive film layer 106, and the polymer film layer 108 can also be seen. As shown, the polymer film layer 108 is directly exposed to the IR heat source 902. In some embodiments, a single IR heat source 902 can be used. For example, the heat source can be a tunnel configured to apply heat circumferentially around the car 1001. In other embodiments, an array of heat sources can be used.

Figure 7:
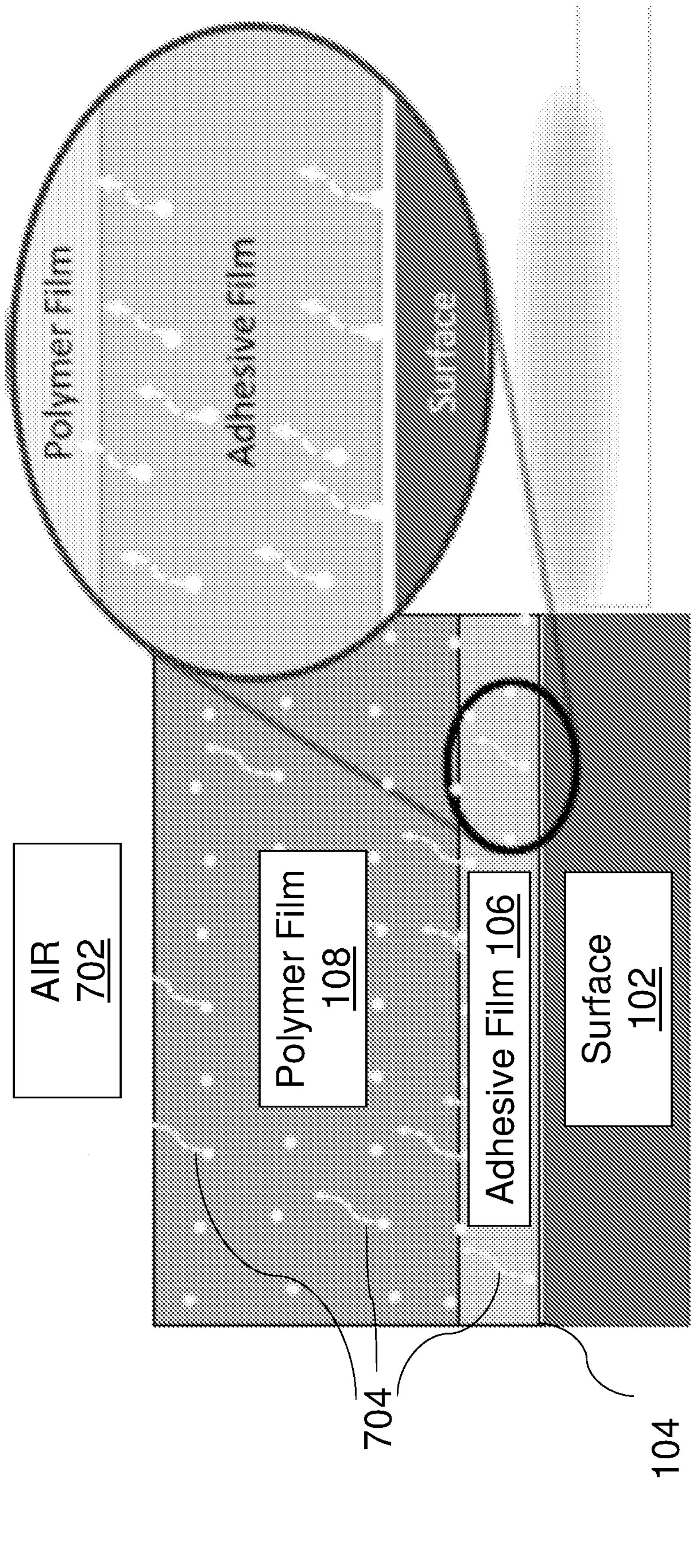
FIG. 7 illustrates a basic drying process of a paint film when exposed to air.
Figure 8:
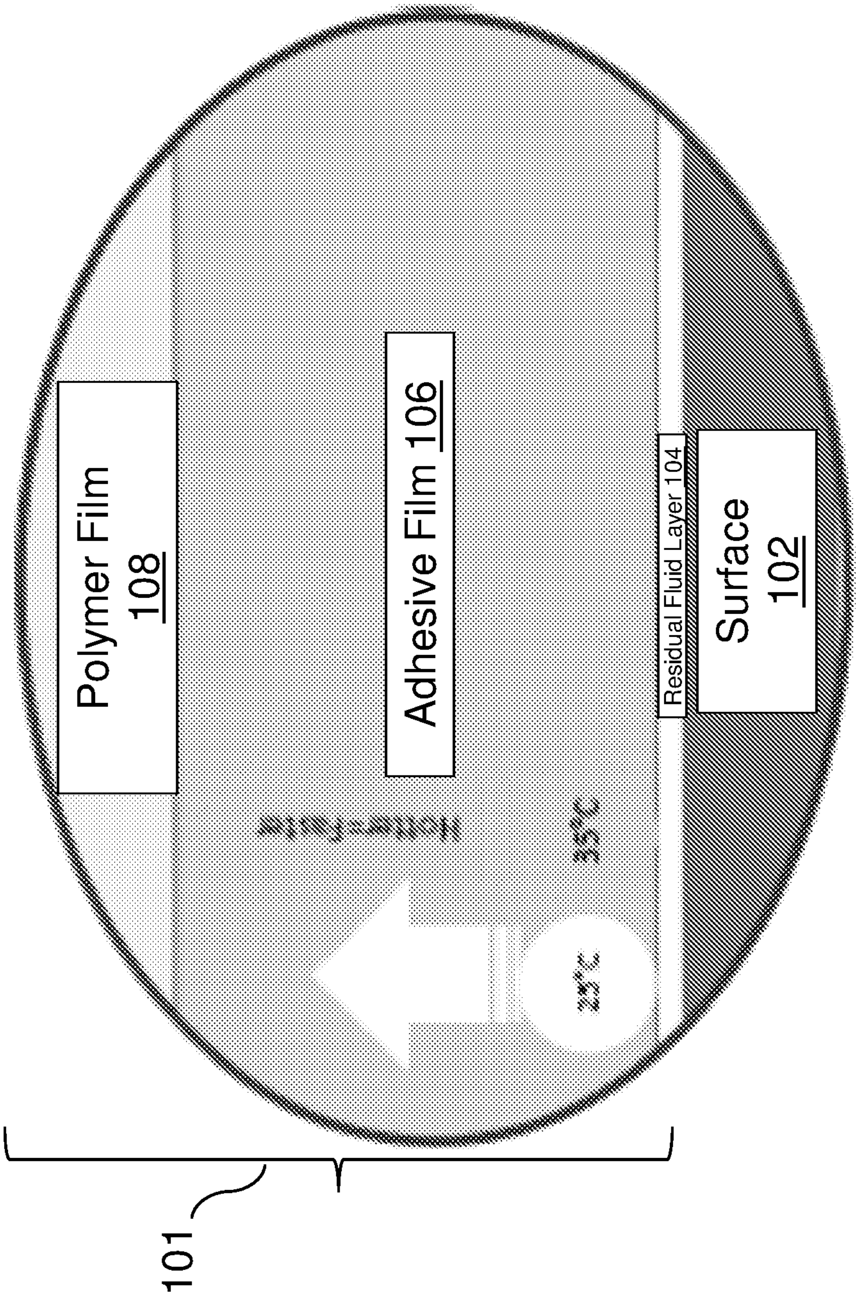
FIG. 8 illustrates the effects of heat on the drying process of a paint film.

FIG. 7 illustrates the basic drying process of the paint film 101 when exposed to air. As shown, the process of drying occurs when individual water molecules diffuse though the polymer network in the polymer film 108 and into the air 702. The diffusion of water molecules is shown by the arrows 704. FIG. 8, in turn, illustrates the effects of heat on the drying process of the paint film 101 (e.g., as described with respect to step 1110). As is well known in the art, the rate at which water molecules diffuse through a polymer network of a polymer film is called a moisture vapor transmission rate (MVTR) of the polymer film. Thus, in general a film's MVTR can determine how quickly a wet installed film will dry. Additionally, MVTR increases with temperature by approximately 5% for every 1° C. increase in temperature. Therefore, as shown in FIG. 8, the paint film 101 can dry faster, for example, at 35° C. than at 25° C. Because the MVTR of a film increases with temperature, IR heating can improve adhesion of the paint film 101 to the surface 102 by removing the water molecules in the fluid layer more quickly, thus reducing the time it takes for the adhesive layer 106 to fully adhere to the surface 102. In some embodiments, the use of IR heat as described herein can increase the MVTR of the paint film 101 by 2 times, 5 times, or 10 times or more. Additionally, in some embodiments, use of IR heat can decrease the drying time relative to drying at room temperature by at least 75%, such as at least 85%, such as at least 95%.

Using IR heat to dry the film can also have additional and unexpected advantages. In particular, the use of IR heat during drying of the paint film 101 can bring about a much stronger or a more effective adhesion of the paint film 101 to the surface 102. If one were to represent an extent of adhesion using an adhesion value, then it was discovered that the adhesion values of the paint film 101 to the surface 102 using IR heating exceeded even the maximum values obtainable at room temperature, indicating that the improved adhesion levels cannot be simply attributed to removal of water molecules. Rather, when the adhesive layer 106 is a pressure sensitive adhesive (PSA), IR heating may improve Van Der Waals forces that traditionally bond the PSA to the surface 102. This unexpected improvement may be a result of synergy between the presence of water molecules in the fluid layer 104 and the application of IR heat. That is, plasticization occurs when a solvent-type molecule (e.g., water) diffuses amongst the polymer chains, disrupting the polymer network and resulting in lowering the viscosity of the polymer in the PSA. This lower viscosity can enable the PSA to flow into the small cavities of the surface 102, promoting stronger van Der Waals forces and therefore stronger adhesion.

Figure 9:
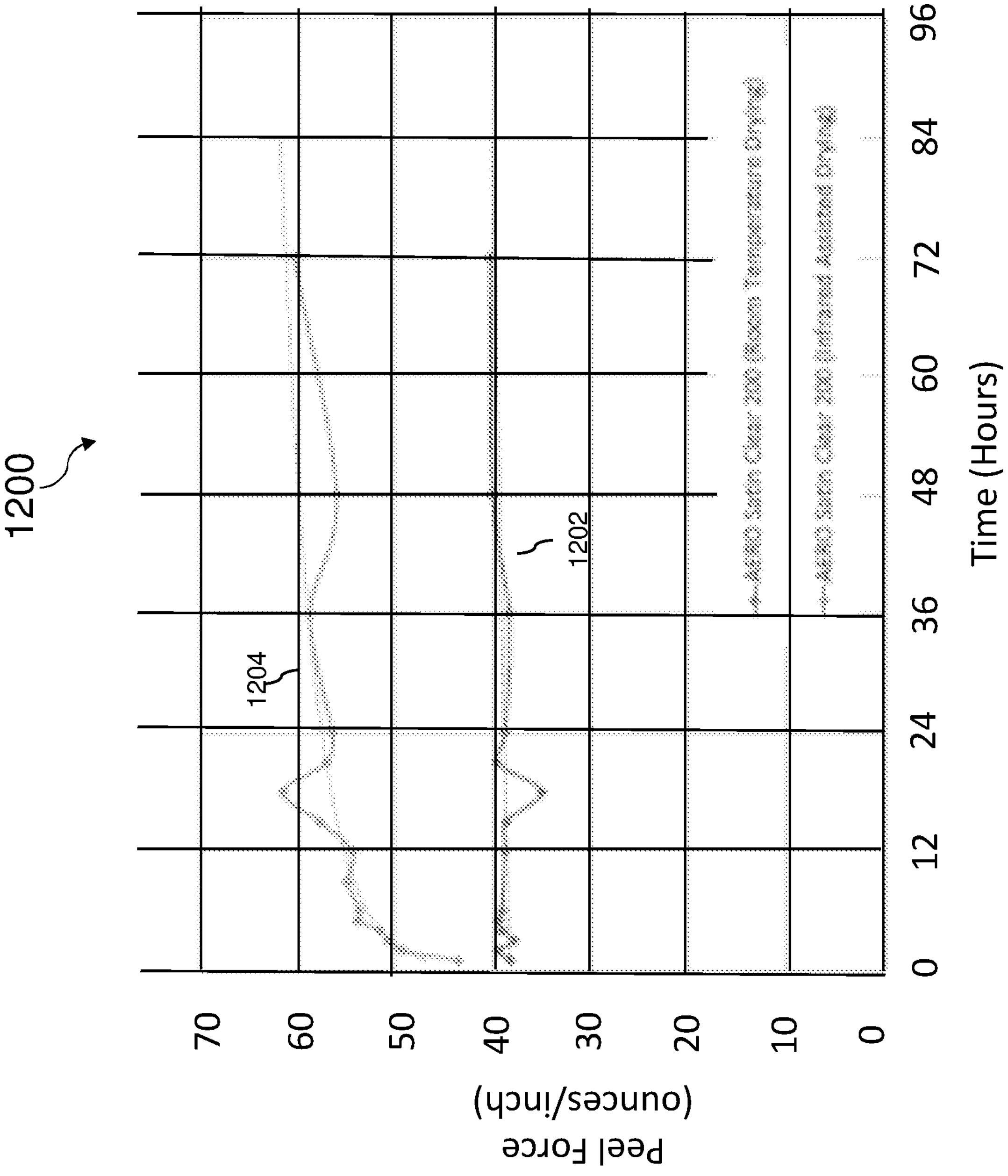
FIG. 9 is a graph of experimental results comparing the peel force over time when infrared heat assisted drying is used to dry a paint film vs when the film is dried at room temperature.
Figures 10A, 10B, 10C, 10D, 10E, 10F:
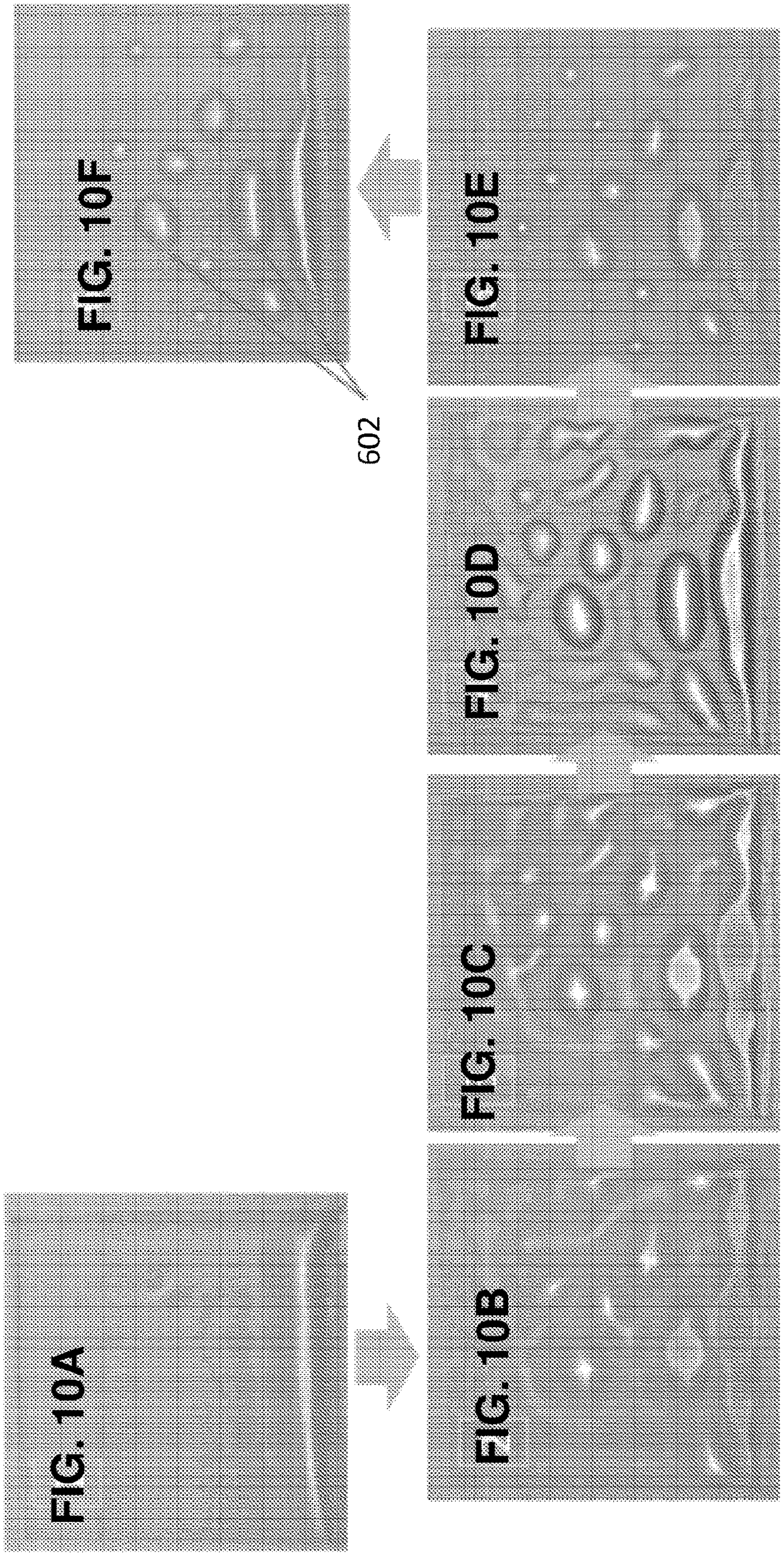
FIGS. 10A-10F illustrate the formation of defects during drying after a wet installation process.

FIG. 9 illustrates a graph 1200 of experimental results achieved by applying a paint film (as described herein) to a surface with and without IR heat assisted drying. During the experiment, paint film samples were applied using a wet installation process to paint panels. One set of panels was maintained at room temperature. The other set was placed under a bank of infrared lamps. At specified intervals, one film sample from each set was tested to determine how quickly adhesion occurred under each condition. After the first hour, the adhesion in the sample exposed to the infrared lights was significantly higher than the samples drying at room temperature. In fact, Applicants discovered that the sample exposed to infrared lamps developed higher adhesion after one hour than that developed in the room temperature sample even after 72 hours.

Referring still to FIG. 9, curve 1202 indicates the experimental data from the room temperature set drying while curve 1204 that indicates experimental data from IR heat assisted drying of the paint film 101. As can be seen from the curve 1204, the IR heat exposed film can withstand a peel force of more than 60 ounces/inch (approximately 63 ounces/inch) after about 18 hours, whereas the room temperature film can withstand a peel force of less than 40 ounces/inch (approximately 45 ounces/inch) after about 18 hours. Moreover, in 72 hours, the room temperature film could only withstand a peel force in the range of 35 ounces/inch to 40 ounces/inch while the IR heat exposed film can withstand a peel force in the range of 43 ounces/inch to 63 ounces/inch. Because the ability to withstand a higher peel force is indicative of adhesiveness, it can be construed from the experimental results that the IR heat exposure adheres the paint film faster than room temperature drying.

In some embodiments, IR heating may also improve the defect correction process for wet installation of thin films. That is, referring to FIGS. 10A-10F, during drying (either with air or IR heat), fluid from the residual fluid layer 104 can migrate laterally and can, over time, coalesce into thicker pockets of fluid. The lateral movement of fluid can also enable the tiny bubbles of entrapped air to coalesce over time, which may result in the formation of large, visible air bubbles. The coalescence of water and/or air can result in defects 602 in the film. FIGS. 9A-9F illustrate the formation of defects 602 in a film 101 that can occur as a result of the of air or water bubbles. Advantageously, the use of IR can reduce the number of defects formed by decreasing the drying time and therefore reducing the amount of time available for the water and/or air to converge into defects.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited.

Any theories set forth herein are subject to change pending further testing and analysis. As such, the inventors do not intend to be bound by any theories proffered herein as to, for example, what factors contribute to physical properties described in conjunction with paint film appliques and individual layers therein.

It should be understood that any feature described herein with respect to one embodiment can be used in addition to or in place of any feature described with respect to another embodiment.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as “under” or “beneath” other elements or features would then be oriented “over” the other elements or features. Thus, the exemplary term “under” can encompass both an orientation of over and under. The device may be otherwise oriented (rotated 90 degrees or at other orientations) and the spatially relative descriptors used herein interpreted accordingly. Similarly, the terms “upwardly”, “downwardly”, “vertical”, “horizontal” and the like are used herein for the purpose of explanation only unless specifically indicated otherwise.

Although the terms “first” and “second” may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word “comprise”, and variations such as “comprises” and “comprising” means various components can be co-jointly employed in the methods and articles (e.g., compositions and apparatuses including device and methods). For example, the term “comprising” will be understood to imply the inclusion of any stated elements or steps but not the exclusion of any other elements or steps.

As used herein in the specification and claims, including as used in the examples and unless otherwise expressly specified, all numbers may be read as if prefaced by the word “about” or “approximately,” even if the term does not expressly appear. The phrase “about” or “approximately” may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term “invention” merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of applying a paint film to a substrate, the method comprising:

wetting a surface of a substrate or a pressure sensitive adhesive layer of a paint film to form a fluid layer thereon, the paint film further comprising a polymer film layer;

applying the paint film to the substrate such that the fluid layer is positioned between the pressure sensitive adhesive layer and the surface; and heating the applied paint film with infrared heat to 30° C. to 100° C. to facilitate the removal of the fluid layer and adhere the pressure sensitive adhesive layer to the surface;

wherein the heating with infrared heat reduces a drying time of the paint film by at least 75% compared to a drying time of a paint film dried at room temperature; and wherein the heating with infrared heat results in the pressure sensitive adhesive layer flowing into cavities on the surface of the substrate.

2. The method of claim 1, wherein the step of wetting comprises wetting both the surface and the pressure sensitive adhesive layer.

3. The method of claim 1, further comprising using a squeegee to remove a portion of the fluid layer prior to heating.

4. The method of claim 3, wherein the portion comprises at least 80% of the fluid layer.

5. The method of claim 1, wherein the polymer film layer comprises a moisture vapor transition rate (MVTR) of at least 1 $g/m^2/24$ hr.

6. The method of claim 1, wherein the polymer film layer comprises polyurethane.

7. The method of claim 1, wherein the pressure sensitive adhesive layer comprises polyacrylate.

8. The method according to claim 2, wherein heating the applied paint film with the infrared heat increases the moisture vapor transmission rate of the paint film by at least 2 times.

9. The method according to claim 1, wherein the paint film is adhered to the surface of the substrate in less than 60 minutes.

10. The method of claim 1, wherein the substrate comprises a motorized vehicle.

* * * * *